United States Patent [19]

Maus et al.

[11] Patent Number: 5,244,606
[45] Date of Patent: Sep. 14, 1993

[54] FASTER CYCLING METHOD AND APPARATUS FOR OPTICAL DISK REMOVAL FROM INJECTION MOLD

[75] Inventors: Steven M. Maus, Osseo; George J. Galic, Columbia Heights, both of Minn.

[73] Assignee: Galic Maus Ventures, Columbia Heights, Minn.

[21] Appl. No.: 895,474

[22] Filed: Jun. 8, 1992

[51] Int. Cl.⁵ .............................................. B29C 45/40
[52] U.S. Cl. ...................................... 264/1.3; 264/161;
264/328.8; 264/328.14; 264/334; 425/547;
425/554; 425/556; 425/564; 425/436 R;
425/810
[58] Field of Search .................... 264/1.3, 106, 328.1,
264/161, 328.7, 328.8, 328.9, 328.14, 328.15,
334, 335; 425/547, 548, 549, 553, 554, 556, 564,
565, 566, 568, 571, 577, 808, 810, 436 R, 436
RM, 437

[56] References Cited

U.S. PATENT DOCUMENTS

| | | |
|---|---|---|
| 3,767,342 | 10/1973 | Potter . |
| 3,804,568 | 4/1974 | Rees . |
| 3,910,740 | 10/1975 | Rees . |
| 4,118,168 | 10/1978 | Rees et al. ............ 425/810 |
| 4,185,955 | 1/1980 | Holmes . |
| 4,231,987 | 11/1980 | Osawa . |
| 4,260,360 | 4/1981 | Holmes . |
| 4,368,018 | 1/1983 | Rees . |
| 4,438,065 | 3/1984 | Brown . |
| 4,660,801 | 4/1987 | Schad . |
| 4,715,806 | 12/1987 | Ehrler . |
| 4,738,613 | 4/1988 | Eichlseder . |
| 4,793,953 | 12/1988 | Maus . |
| 4,820,467 | 4/1989 | Ehrler . |
| 4,828,769 | 5/1989 | Maus . |
| 4,880,587 | 11/1989 | Eichlseder . |
| 4,981,634 | 1/1991 | Maus . |
| 5,059,370 | 10/1991 | Kojima . |
| 5,068,065 | 11/1991 | Maus . |
| 5,160,751 | 11/1992 | Eichlseder et al. ........ 425/810 |

FOREIGN PATENT DOCUMENTS

57047612 3/1980 Japan .
60-040222 2/1985 Japan .

*Primary Examiner*—Jill L. Heitbrink

[57] ABSTRACT

A molded disk is transferred out of the mold with short-stroke low-mass motions of a pair of mechanical guides which can grip, then release, the O.D. edge of the molded disk, when acting in coordination with movable mold members having undercuts for molded-on retention of the inner portion of the molded disk and/or sprue. Acting together, the disk is stripped off the molding surfaces and can be oriented in a second vertical plane to freely drop out an aperture in the mold, to exit through a discharge chute. Two ways of separating the sprue from the disk are shown, with a molded-in center-hole being preferred. This method and apparatus for transferring the molded disk out faster by gravity discharge wherein an optical disk mold can be enclosed against airborne dirt throughout molding cycles.

28 Claims, 5 Drawing Sheets

FASTER CYCLING METHOD AND APPARATUS FOR OPTICAL DISK REMOVAL FROM INJECTION MOLD

FIELD OF THE INVENTION

The invention relates generally to injection molding optical disks and more specifically to improved ways of removing the solidified optical disk from the moldset and forming a centerhole in the optical disk.

BACKGROUND OF THE INVENTION

Injection molded optical disks have grown enormously in the last five years worldwide. In the U.S. alone is 1990, over 400,000,000 audio compact disks (CD) were made and sold. This does not include the millions of video disks or the various optical data storage computer memory disks such as CD-ROM or erasable magneto optical disks. As is typical with a high production-volume manufacturing operation, productivity has also greatly increased in the last five years, with the injection molding cycle time of CDs going from "highest state of art" five years ago at twelve seconds or more, to less than half that today. Still, there remains considerable room for improvement, as can be seen by considering that each injection molding cycle consists of three stages:

1. Injection fill and pack—during which time the molten thermoplastic is substantially flowing.
2. Cooling and solidification time—after meltflow has substantially ceased, the molded optical disk must be sufficiently cooled below its solidification point and glass transition temperature so as to be able to withstand the mechanical shape-distortion forces occurring during ejection; also, the molten sprue must be at least substantially solidified so that it will release from the mold and will not excessively slump or string. (Applicants' U.S. Pat. No. 4,793,953 patent issued Dec. 27, 1988 and U.S. Pat. No. 5,068,065 patent issued Nov. 26, 1991 address these problems, respectively.)
3. Disk removal—the "mold open" time is defined as starting from the time when the clamping forces exerted on the mold are released and the molded disk may be withdrawn from the open mold, and ending only after the mold is again closed and sufficient clamp force has been applied to permit injection to start a new cycle.

In addition, the centerhole must be formed in the optical disk and the sprue must be removed sometime in the cycle.

All known commercially-available injection molding processes for optical disks today (other than Applicants') employ the steps of:

1. opening the disk moldset by axial travel (along the X axis in X, Y, Z coordinate space, for a horizontal injection molding machine configuration used commonly for CD molding) of the movable platen "rearward" (away from the stationary platen side) at the plane of the parting line (designated by Y and Z coordinates, for the horizontal injection molding machine configuration)
2. swinging into position a robotic arm (traveling first in the Y, Z plane, then "stripping in" along the X axis,) until vacuum actuated suction cups mounted at the end of the arm compress onto the disk surfaces near the centerhole (the sprue has already been removed from the molded disk by some punching operation in these "prior art" processes)
3. applying the vacuum with sufficient force to overcome whatever disk retention forces may exist to hold the disk onto the molding surface,
4. reversing the motions of the robotic arm (stripping out along the X axis then swinging out in the Y,Z plane again, to permit the disk moldset to be again closed (by the step of "forward" axial travel of the movable platen toward the stationary platen side) and clamped for the next injection cycle.

Over the last five years, a number of improvements have been made to progressively reduce the amount of time these disk removal steps require. In general, reducing the mass to be moved will make these operations faster, as will also reducing the distance to be traveled. Overlapping simultaneously/concurrently any timed sequences which do not have to be done "in series" or sequentially will be faster. For example, the robotic arm can start to swing into place even while the mold is still opening. Reducing the mass and thickness of the arm allows for use of a smaller mold opening strokelength and faster acceleration and deceleration, provided rigidity is also retained. In addition, the robot arm pivot can be mounted directly onto the moveable side of the moldset, so its proximity and distance to travel is shorter. These improvements have reduced the disk removal time from 3–4 seconds to 1.5–2 seconds within the last five years. However, this still comprises approximately 25–33 percent of the total injection molding cycle time for a CD today. The use of vacuum actuated suction cups in particular costs cycle time, since each actuation time is approximately 0.15 second, and valve actuation and signal delays are inherent to such a system. Its inherent complexity causes a lack of durability or robustness for high production operations, resulting in downtime.

PRIOR ART

Many conventional injection molding processes for optical disks enclose the molding space for cleanliness. J6 0040-222-A Feb. 3, 1985) assigned to Matsushita opens the enclosure only while the robotic arm goes in and out of the open disk moldset.

Although Rees (U.S. Pat. No. 4,368,018) doesn't mention optical disks, it teaches a robotic arm driven in coordination with the mold opening stroke. Its swinging into position of the robotic arm until vacuum actuated suction cups 144' (FIGS. 4 & 5) mounted at the end of the arm 142' could be used to compress onto the disk surfaces if supplemented with an X-axial-traveling stripping cylinder.

It would be best to eliminate both enclosures and robotic arms with suction cups if possible. Applicants'U.S. Pat. No. 4,981,634 issued Jan. 1, 1991 (and its parent application Ser. No. 355,754 filed May 22, 1989, and divisional U.S. Ser. No. 07/587,483; all of which are incorporated herein by reference) teaches a new way to injection mold optical disks without opening the moldset to expose either the molded disk or the optical part forming surfaces of the mold to airborne contaminents. However, another benefit of this method and apparatus is that potentially a faster disk removal cycle time can be obtained, since the mass and distances traveled of the moving parts of the mold are as much as an order magnitude less than the conventional "prior art" practices just described. In addition, embodiments were shown which potentially could eliminate the use of the robotic arm fitted with vacuum actuated suction cups to engage the disk surfaces for positive removal.

However, in scaling up Applicants' invention in CD production, it was found that anything short of perfect release of the molded disk and/or sprue from the disk mold cavity's partforming surfaces and/or sprue assembly was troublesome. Furthermore, even if the disk and sprue can be reliably transferred from the stationary side of the mold in moving from a first position to a second position, and even if perfect release is likewise obtained thereafter from the movable side of the mold as well, it is too easy to upset the delicate balance of forces during such disk transferring and ejection steps to cause the disk to vary in its vertical orientation with respect to the downward facing aperture. Every cycle must be exactly the same, for fastest and troublefree operations in production.

A second function besides disk removal which every optical disk molding process must take into consideration is how and when to form the centerhole. Some of the very first processes of the early '80s actually left the molded sprue attached to the molded optical disk and removed both of them from the mold, thus requiring a secondary operation such as laser cutting of the centerhold and separation of the sprue from the disk. This secondary postmolding operation is costly, and generates particles which act as contaminants when the disks are metallized. For obvious reasons, most of the newer disk molding processes (except Krauss Maffei CD molds using the Eichlseder patent) separate the sprue from the molded disk before the moldset opens, thus forming the centerhole in one of three ways:

1. Forming the hole by advancing the core punch element before the plastic is solidified (Applicants' U.S. Pat. No. 4,828,769 issued May 9, 1989, col. 31, ln. 63-68, to col. 32, ln. 1-9; and Kojima, U.S. Pat. No. 5,059,370 issued Oct. 22, 1991, see FIG. 2, text col. 4, ln. 66-70 and col. 5, ln. 1-7).

2. Punching after the plastic is solidified (Holmes U.S. Pat. Nos. 4,185,955 and 4,260,360).

3. Tearing the sprue from the molded disk after the plastic is solidified and AFTER the moldset is opened (Eichlseder U.S. Pat. Nos. 4,738,613 and 4,880,587)

Certain patent references specific to optical disk may have elements which are relevant. Ehrler apparatus patent (U.S. Pat. No. 4,715,806) utilizes an ejector assembly consisting of a concentric sleeve around an ejector core pin which together combine as means for removing the sprue of an optical disk by first punching, with a rearward movement of both sprue and disk, then retaining the sprue onto the movable ejector core pin as it is pulled backwards to a position wherein the sprue is aligned over a hole cut in the ejector sleeve, at which point the sprue is knocked off the core pin and drops out of a hole in the sleeve and on down through the bottom of the disk moldset. Ehrler method patent (U.S. Pat. No. 4,820,467) teaches how to punch the solidified sprue out of the solidified disk and how to remove the sprue part. Furthermore, Ehrler teaches applying a vacuum while this punching is being conducted in order to eliminate the dusting of the solid plastic by sucking it out of the moldset. Eichlseder apparatus patent (U.S. Pat. No. 4,738,613) teaches the use of mechanical retention and undercuts on both the front and back flanges of the sprue, so that there is retention on both sides of the sprue as it is molded. Eichlseder method patent (U.S. Pat. No. 4,880,587) teaches use of an annular gate which staus at least partially open throughout the molding cycle "partially defining an internal aperture" (in a preferred embodiment, the gate size of 30 percent of the disk thickness is stated). Therefore, Eichlseder method joins the solidified disk with the solidified sprue at the solidified annular gate ("film gate") when the mold is ready to be opened, at which time the ejector sleeve moves to separate the sprue away from the disk.

"Prior art" from non-optical-disk processes for injection molding plastics show certain alternative ways to remove molded plastic parts without using robotic arms and suction cups, but aren't sufficiently applicable to the specific geometry and surface quality needs of optical disks. Also, they do not also disclose ways to form the centerhole by separation of the sprue from the disk.

Brown (U.S. Pat. No. 4,438,065) and Schad (U.S. Pat. No. 4,660,801) teach various embodiments using presurized gas or compressed air entering between the mold's partforming surface and the molded part to assist in separating the latter from the former.

Rees (U.S. Pat. No. 3,804,568) uses a transfer plate inserted between the moldhalves at the parting line from above during or after the mold opens, to catch the molded parts as they are ejected off the mold's partforming surface. To assist positive retention of the molded part onto the transfer plate, Potter (U.S. Pat. No. 3,767,342) and Schad uses various combinations of vacuum (sucking the molded part towards a surface) or pressurized gas (blowing off the molded part from a surface).

Guide rails mounted (in a retracted position) within the parting line face of a moldhalf can be brought to an extended position by mechanical linkage to the moldopening motion, and, in the extended position, to engage the molded part as it is ejected off the mold's partforming surface (Rees U.S. Pat. No. 3,910,740). These vertical guide rails extend the length of the mold from top to bottom to maintain slidable contact with the molded part, and an air blower may assist the molded part's vertical movement at least from the mold cavity to a destination directly below the mold.

J5 7047-612 (Feb. 3, 1985) assigned to Matsushita employs similarly guide rails moving between these same 2 positions (from retracted to extended, and back again) "synchronously with the closing and opening operations of the die", but the molded part is never grasped or held.

Osawa method patent (U.S. Pat. No. 4,231,987) is believed to be the most relevant reference for method steps. Osawa uses similar guide rails having a very specific [-bracket-shaped sectional view in similar ways to Rees, but by projecting the tips of his ejector pins (15) forward (driven by a hydraulic ejector cylinder (17) mounted on the movable platen) into the B side of the mold cavity before injection, so that the molded part (21) is presumably formed around these tips. Then after the mold opens, by pushing the ejector forward in a conventional way, the molded part is conventionally separated off the mold's partforming surface but doesn't then drop free. The molded part is still retained onto the ejector pin tip until the guide rails are extended into position (not yet contacting the molded part), after which the ejector is retracted back, now contacting the molded part against a face of the bracket-shaped [ guide rail and as the ejector pins continue back further, only then does the molded part drop free.

No means of adding a controlled mechanical retention, such as creating an undercut into the sidewall or face of the ejector pin, is mentioned by Osawa, so it must be assumed that his pins are the standard smooth-surfaced cylindrical pins with a flat face of the type purchased from mold catalog sources such as D-M-E of Madison Heights, Mich. Then the force holding the molded part onto the pin must be solely due to the thermal shrinkage of the plastic which has surrounded that length of the pin which has protruded into the mold cavity. Greater protruding length will, other things equal, give more retention forces, up to a practical limit (protruding too greatly disrupts plastic flow during filling the mold cavity; hard stop limits of the mold restrict how far ejector plate (20) can travel, so when the ejector is fully retracted back, the tips of the pins must protrude into the mold cavity. See FIG. 2).

Osawa patent is assigned to TDK, a leading maker of video and audio cassette tapes, and it is believed that the box-shaped molded parts illustrated in Osawa are cassette halfs. To work, Osawa's parts need to be quite rigid. The sidewall of the box-shaped molded parts illustrated in Osawa have great rigidity. However, if flexing of the molded part occurs, that would prevent it from being removed by its contact with the face of the [ -shaped guide rails. A flexible part would merely bow in the center when the ejector is fully pulled back, leaving the molded part stuck on the pins, since the Osawa ejector cannot be pulled back far enough to bring the tips of the pins past the mold core (19) surface, which would create a positive stripping action if it could be done. (If the Osawa ejector could be pulled back far enough to bring the tips of the pins past the mold core surface, then the pins would not be in position to protrude into the mold cavity on the next molding cycle.)

Methods for adapting these Osawa steps to molding an optical disk are lacking:

1. the optical disk is thin (CD specs=1.12–1.20 mm) and quite flexible (typically, the CD is made of polycarbonate plastic demolded warm, at 180°–250° F. typical temperatures). It would be impossible to strip with Osawa, since the warm thin disk would merely flex at the middle with the outer diameter (O.D.) edge held by the [ shaped guide rail at the point ejector motions are completed to hard stop. Even if Osawa was not limited in ejector stroke length, if too great a deflection of the still-warm disk's center relative to the O.D. edge occurs, optical stresses (polymer birefringence) will develop, causing unacceptable refraction of the laser beam. (Other means for stripping the disk must therefore be added.)

2. since the dimensions of such disks must conform to international standards (ISO), protruding male ejector pins (or male ejector sleeves) would unacceptably mar or alter dimensionally the product.

3. as a practical matter, the centerhole of the disk cannot be cut after the disk is dropped in secondary operations. No means or steps for forming such a centerhole is taught by Osawa, nor how such additional steps could be added to the claimed step sequence.

4. the Osawa guide rails move from a position external to the moldset into a position wherein the molded part will be pulled onto one of the flat faces of the bracket [ shaped guides by the return motion of the ejector with sufficiently great force to overcome whatever forces are holding the molded part onto the tip of the ejector pin, then as the return motion of the ejector continues the molded part is dropped free. Such large-surface contact and force during stripping off the pins would damage the information-bearing faces of the optical disk. Also, when free-dropped within the [ shaped guide rails, thin disks could tumble back and forth, bumping against the opposing inside faces of the bracket. Positive means for avoiding such damaging contact is lacking.

5. Osawa's sequence is simplistic; either the guide rails are the first position or the second position. For preventing tumbling of the molded part when stripping off the pins, a better sequence would be to firmly grasp the part (being careful to contact only the edges, not against the [ shaped faces) until vibrational damping is done (a brief time delay interval after stripping) before retracting slightly the guides to allow the molded part to drop, yet not so fully retracted as to permit the dropped part to wobble in flight or to lose a purely vertical orientation.

SUMMARY OF INVENTION

The present invention provides for positive and "foolproof" transfer of the molded optical disk:

1. from the partforming surfaces of the stationary side of the mold cavity, and 2. from the partforming surfaces of the movable side of the mold cavity. (These steps are not necessarily in this order, or they may be done concurrently; a preferred embodiment will show these steps in this order, however.)

An essential element of the invention is at least one mechanical "guide" (preferably, a coordinated pair) which controllably travels between at least 2 positions ("retracted" and "extended"; preferably, a third position—"fully extended"—is sequenced between "retracted" and "partly extended" positions). These guides are typically mounted in the moldset in the outer perimeter areas just outside of the mold cavity ("closer is better", for faster motions). Optionally but preferably, when they are extended, they make firm but non-damaging contact with the outer O.D. edges of the molded optical disk (avoiding contact with the optical faces of the disk), at the desired step in the demolding portion of the process sequence, but the guides are retracted when not demolding a solidified disk.

This process sequence is done by deliberately NOT separating the central portion of the molded optical disk (with or without its sprue separated from the disk) away from undercuts (preferably, of a female geometry) in certain members of the moldset until AFTER the steps of separating the disk from mold partforming surfaces and the guide(s) have been moved into one of the above-mentioned extended position have been completed, so that guide contact on the outer O.D. edges of the molded optical disk is either firmly made or will be made when stripping motions are done.

Such undercuts can provide a controlled degree of mechanical retention when the molten thermoplastic resin flows into these undercuts and solidifies therein. At a later time, a mechanical stripping action (in which the undercut is moved relative to an adjacent stripping edge) can elongate temporarily the "molded-on" solidified plastic to release from the undercut. If the disk and sprue are still joined together until the steps of separating the disk off the opposing partforming surfaces, then an undercut simply placed on the top surface of a male member of the sprue bushing assembly can hold the sprue until it is desired to separate the sprue from the disk. Alternatively, if the disk centerhole has been molded-in (by closing off the annular gate while the thermoplastic is still molten), an undercut placed upon the top end of the outside diameter surface of an axially-movable sleeve can hold controllably the inner central portion of the disk until the mechanical stripping motion releases the disk off the undercut—in this case, the sprue does not contribute to the desired retention of the inner central portion of the disk.

Therefore, another essential element of the invention is to provide sufficiently great mechanical retention forces via a controlled-undercut designed-in geometry onto a disk transfer means within the mold (such as a member of the sprue bushing assembly or a sleeve member of the ejector/hole punch assembly), so as to assure that such retention forces will be deliberately greater than any possible retention forces encountered on either of the two transfer steps. Then, necessarily, any controlled motion of the disk transfer means (i.e. the mold member with undercut geometry) with respect to the disk cavity partforming surfaces will predictably and reliably result in relative motion of the molded disk (and/or sprue, if still attached to the disk) relative to said disk cavity partforming surfaces. Thus, mechanical ejection can be done without additional moving parts.

With this combination of elements, the need for any robotic arm and suction cup grabbers to facilitate pulling the disk off of conventional disk mold's movable moldhalf's partforming surface is entirely eliminated. Preferably, the disk is held by its outer O.D. edges in firm contact with the guides until ready to be released, and thus is very reliably maintained in the desired alignment with respect to an aperture located at the outer perimeter of the mold cavity. Such an aperture could optionally be faced sideways (i.e. at about a 3 o'clock or 9 o'clock position) or straight up (i.e. at about a 12 o'clock position). In such cases, an additional driving force (such as partial vacuum exerted via Venturi effect from strategically-placed jets of filtered dry compressed air) may be needed to suck the disk through the aperture (to pull it uphill, if needed). However, preferably the aperture will be downward-facing (i.e. at about a 6 o'clock position) and the disk will be preferably directly above in the same vertical plane, so that gravity drop of the disk at the appropriate time will assure that the disk passes freely through the downward-facing aperture, thereby exiting the mold (most preferably, through a discharge chute mounted onto the mold as an extension of said downward-facing aperture and lying in substantially the same Y,Z plane). Gravity drop then replaces robotic arm travel.

In one optional embodiment, the disk removal function of the present invention is combined with the centerhole formation and sprue separation function so that the latter are conducted at a step AFTER the molded optical disk is solidified and after the moldset is opened. Eichlseder (U.S. Pat. Nos. 4,880,587 and 4,738,613) show how tearing of a film gate can be done in conventional mold-opening steps, to separate the sprue from the disk and make the centerhole. Related ways of tearing a film gate by either pushing or pulling the sprue while the central portion of the disk is held against part of the mold which serves as a shearing die provide a functional equivalent to Eichlseder, and might also be done after the disk has already been freed of both opposing partforming surfaces of the disk mold cavity but before the disk exits the space between the 2 mold cavity partforming surfaces.

In another optional but preferred embodiment, the disk removal function of the present invention is combined with the centerhole formation and sprue separation function so that the latter are conducted at a step BEFORE the molded optical disk has already been freed of both opposing partforming surfaces of the disk mold cavity but before the disk exits the space between the 2 mold sides. (In this preferred embodiment, the centerhole may be "molded in" while the plastic is not yet solidified, and a required degree of molded-in undercut is formed in the central portion of the disk, joining it mechanically to a movable mold member until the disk is properly aligned relative to the aperture, at which time the movable mold member is withdrawn and the disk pops off.)

This combination of these two functions requires that a guide system preferably a coordinated pair of short-stroke, low-mass mechanical ("guides") travel between at least 2 positions in coordinated sequence with one of the 2 above-mentioned centerhole formation sequences. In the most preferred embodiment, 3 positions are used:

1. a first, retracted position (mounted in the parting-line face of a moldhalf just outside the outer perimeter of the disk mold cavity, preferably integrated into the O.D. stamper retainer ring), held until after the disk has been separated off the mold cavity's opposing partforming surfaces, 2. then moved to a second, fully extended position wherein suitably-contoured guide surfaces make controlled contact with the outer surfaces and/or edges of the disk (preferably, not making contact with any of the inner information-bearing disk surfaces), remaining in that second position at least until the disk is aligned properly to exit by gravity through the aperture, 3. then moved to a third, partly-extended position (intermediate between first and second positions), at which point the guide surfaces lose contact with the disk.

This combination of guide positions and sequenced motions assures positive orientation of the disk with respect to said downward facing aperture in the same vertical Y,Z plane, without extending the guide surfaces the whole vertical length of the mold as required by conventional guide tracks and rails.

BRIEF DESCRIPTION OF THE DRAWINGS

Referring to the drawings, wherein like numerals refer to like parts throughout the several views:

FIGS. 2Bb, 2Cc and 2Dd respectively show in zoomed-in partial view of the detailed workings of the undercuts used to retain and stripping edges used to release the molded optical disks in process steps.

FIG. 3 shows a novel way of "molding in" the centerhole. See FIG. 3, A-D, partial cross-sectional views of a greatly-simplified disk moldset of this embodiment, featuring the sprue assembly and disk cavity at several different positions within the same injection molding cycle.

DETAILED DESCRIPTION OF THE INVENTION

Especially preferred embodiments combine the above elements and steps into the apparatus of Applicants' commonly-owned U.S. Pat. No. 4,981,634 incorporated herein by reference; see therein especially FIG. 2B (showing the disk and sprue being formed in a first vertical plane and first position of the disk moldset) and FIG. 2D (showing the disk (16) having been transferred to a second vertical plane—aligned over a downward-facing aperture (43)—in a second position of the disk moldset, and the sprue (24) separated from the disk). FIG. 2E shows how both disk and sprue can then be transferred out of the disk moldset by gravity drop, without any robot removal means. The present invention provides novel methods and apparatus for accomplishing these disk molding steps very efficiently and reliably.

However, the present invention can be just as advantageously applied to conventional disk molding, by eliminating the robotic arms and suction cups which contact onto the face of the disk. The larger the mold-opening stroke that is used, the slower will be the demolding cycle time, however, and the greater the chance of airborne contaminants have of touching the cleanly-molded optical disk or the optically-polished partforming surfaces of the disk mold cavity.

In describing the motions of the mold members, it will be useful to define the disk moldset as having 2 opposing moldhalfs on either side of a parting line plane along which the mold opens and closes. A movement away from the parting line will be said to be moving rearward, a movement toward the parting line will be said to be moving forward, regardless of whether the movement is on the stationary ("A side") or movable ("B side") moldhalf. In the case of the moving guides, when a guide is being extended, it is said to be moving forward (moving into the disk cavity), and when a guide is being retracted, it is said to be moving rearward (moving out of the disk cavity).

Figure 1:
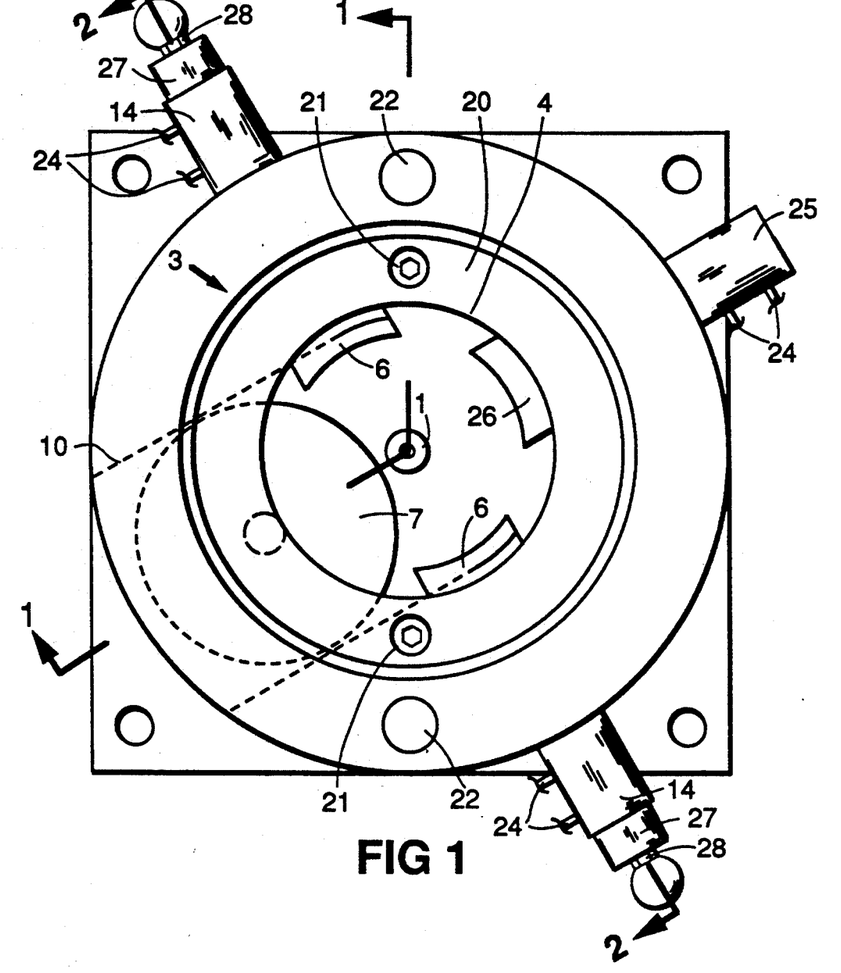
FIG. 1 shows a side view facing into the disk mold cavity (viewing the mold from an open parting line), showing the relative positions of the guides and aperture, and a 1—1 section passing through the moldset.
Figure 1A:
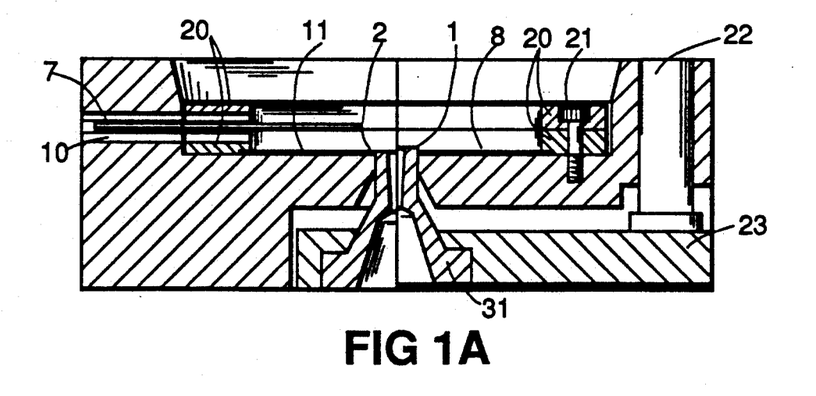
FIG. 1A shows this simplified 1—1 cross-sectional (split top and bottom) view of a disk moldset of the present invention.
Figure 2:
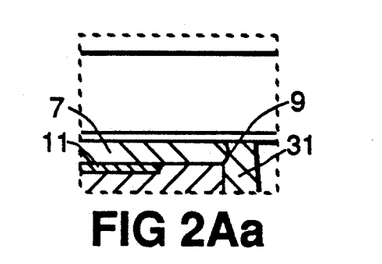
FIG. 2 shows detailed workings of the guide system, viewed from B—B section of FIG. 1. Shown in FIGS. 2A, 2B, 2C and 2D are partial sectional views showing only half of the disk mold cavity (from the outer perimeter—where the guide assembly is mounted—to the centerline).

See FIG. 1 and 1A of the present invention. Elements of the novel disk mold apparatus are shown in simplified split side view in FIG. 1 (viewing the mold from an open parting line) and, looking in along 1—1 section, a simplified cross-sectional (split view) in FIG. 1A:

1. a male member (1) of a sprue bushing (31) assembly which is capable of controllable axial motion and which has sufficient undercut geometry (see (9) in FIG. 2Aa), preferably onto its top O.D. end facing into the disk mold cavity, to controllably bind the central inner portion of the molded disk (7) (directly, or indirectly through the attached sprue).

(Alternatively but not shown in FIG. 1, the male member (1) will be part of an ejector assembly which includes also a stripping edge (2) capable of acting as a shearing die when relative axial motions are produced between the male member (housed inside a substantially-concentric sleeve) and the sleeve. See FIG. 4)

2. A guide system (3), preferably mounted flush with or just outside of an outside perimeter (4) of the disk mold cavity (especially preferred is mounting into stamper O.D. retainer ring (20). Shown here is a coordinated pair, but a single guide with a paddle of up to 180 degrees of hemispheric arc could be used. The guide system is capable of controllable motion between at least 2 positions (preferably 3), from a first ("retracted") position to a second (optionally but preferably, a "fully extended") position and to a third ("partly extended") position, which can be operated in coordinated sequence with the other prescribed motions of the moldset. Because FIG. 1 shows the disk (7) exiting through a disk transfer slot or aperture, the pair of guides (6) in top view is shown "partly extended". In actual operation they will move together in and out as a coordinated pair, to be extended and retracted as needed between these 3 positions. Preferably, guides will have a V-profile end-configuration of a general paddle shape (not as rails or tracks running the whole vertical length of the moldset), so as to contact the molded optical disk near its outside O.D. edge only. The preferred V profile of the guide minimizes contact area between disk and guide surfaces (see FIG. 2A–2C).

3. (optional) In FIG. 1, a "disk driver" (26) is shown, preferably mounted directly opposite (by 180 degrees) to the disk transfer slot or aperture (10); shown here in the top half (with respect to a horizontal centerline) of the disk cavity perimeter (4). Like the pair of guides, it may be controllably be moved forward or back by means of a double-acting air cylinder (25) (see FIG. 2A–2C for details of sequence). Functional equivalents would be hydraulic cylinders, electrical solenoids and other drive means well known to the art. Gravity alone can act to drop the disk, but in the optional but the preferred 3-position process sequence, when the guides are just about be moved into the partly extended position and thereby to lose contact with the disk edge, energizing the disk driver's cylinder pushes its paddle into its extended position, striking the disk and accelerating thereby its drop speed.

See FIG. 1A, the split cross-sectional view of only the stationary moldhalf, for simplicity. Righthand split view shows the disk moldset in its first position (closed), which is held during the molding cycle's steps of injection and solidification of the disk (7). Lefthand split view shows after separation of the molded disk (7) off the disk mold cavity's partforming surfaces (8), with the disk moldset now in its second position (open), transferring the molded disk out of the disk moldset through aperture (10).

Preferred positioning of the guide system in extended positions is such that in the second (and in an optional third) guide position the guides support the molded disk in a second vertical plane, in which lies both the molded disk (7) and an aperture (10) through which the disk may be discharged. See FIG. 1, which shows how the partly-extended-position guides (6) have located the disk in line with aperture (10), and optional disk driver (26) has pushed the disk through aperture (10). Note that a V-profile track within a side-mounted discharge chute (not shown) will allow the disk to freely roll on the disk's O.D. edge down an inclined-plane ramp or a helical-angled ramp by gravity forces. Alternatively, but not shown, a straight vertical drop of the disk could be employed by means of a discharge chute assembly mounted onto the bottom of the disk moldset.

Figure 2A:
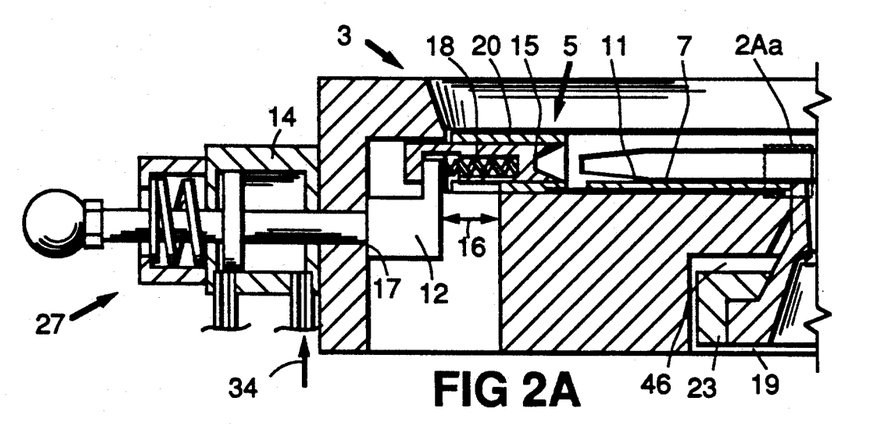
Figure 2B:
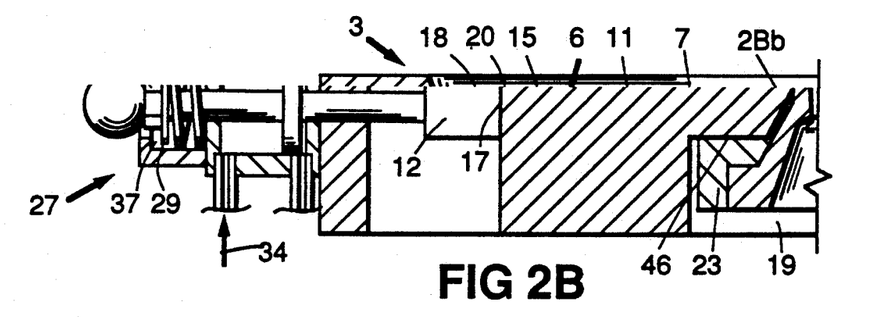
Figure 2C:
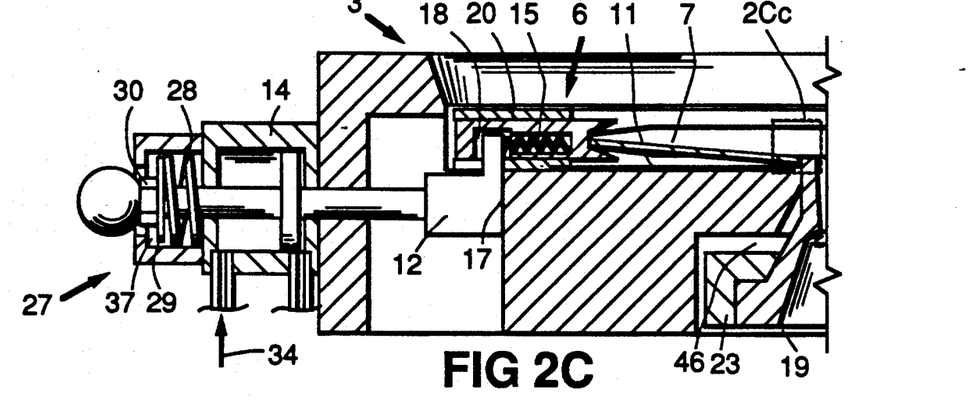

In addition to FIG. 1 and 1A, detailed workings of the guide system is shown in FIG. 2A, 2B, and 2C as partial-split sectional views (looking in at 2—2 section of FIG. 1) showing only from the outer perimeter of the disk mold cavity and the guide assembly inward to the centerline of the disk mold cavity.

Figure 4:
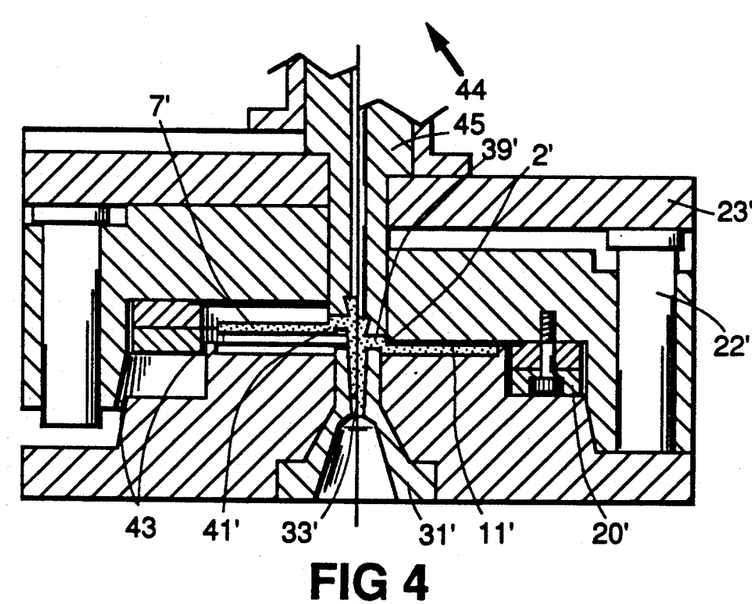
FIG. 4 shows an alternative embodiment, in 2 split-at-centerline partial cross-sectional views of a greatly-simplified disk moldset of this embodiment, within the same injection molding cycle. The righthand split view shows the mold cavity after being filled, the lefthand view after the disk is solidified and demolding is started. Note the sprue is kept attached to the disk while the optical faces of the disk have been separated off the mold cavity's partforming surfaces. The centerhole will thereafter be formed by tearing the sprue out of the disk.

In the first position, shown in FIG. 2A, the mold cavity is opened but the molded disk (7) is still held in its as-molded position. Note that the disk is not in the same plane as disk transfer slot or aperture (10). The disk is shown still stuck onto an electroformed Nickel stamper (11), which is held in position by stamper O.D. retainer (20), as shown. (Alternatively, a partial vacuum could also be sucked between the backsurface of stamper (11) and the mold cavity surface.) Stamper (11) bears encoded digital information so that the molded disk replicates the encoded digital information; it should be noted that such a stamper can be located on either the A side (as shown here) or B side of the mold (as shown in FIG. 4), with no change in function to the present invention.

In FIG. 2A, guide system (3) is in its fully-retracted position so that its forward edges are not within the disk cavity. Note the V-profile edge. Preferably the paddle-shaped guides will be fabricated from a tough self-lubricating abrasion-resistant plastic such as nylon or acetal. The guide is driven by a drive dog (12) which in turn is mounted to a shaft (13) of a double-acting air cylinder (14) using sequence-controlled air pressure (34). An optional but preferred degree of resiliency can be built into this drive linkage for the guides by adding a spring-loaded plunger (15). For example, assume that total shaft travel distance (16) is 14.0 mm run to hard stops (17). The spring-loaded plunger (15) can then accomodate for variations in guide stroke by accomodation gap distance (18) up to 1.5 mm. See the spring-loaded plunger (15) is now undeflected (the spring is at its maximum length in this first position). Note that drive dog stroke gap (16) is now at its maximum and the drive dog (12) is fully retracted against rear hard stop (17). See disk release assembly (27). Actuation of drive dog (12) motions is shown by a pneumatic double-acting cylinder (14), which can be driven rearward against hard stop (17) (by blowing with sequenced air pressure (34) into a forward port as shown in FIG. 2A) or can be driven forward (by blowing with sequenced air pressure (34) into a rearward port as shown in FIG. 2B). In this first step of the disk transfer sequence, as shown in FIG. 2A, when the disk (7) has not been removed from its partforming surfaces (see it is still on the stamper (11)), the sprue bushing (31) is neither fully forward nor back (see strip stroke gap (19) and a similar gap ahead of the stroke limit bar (23)).

The moldset remains in this first position until the disk is substantially solidified, at which time the injection molding machine control will initiate clamp decompression. See also a cavity seal ring encloses the outer perimeter of the disk cavity itself—note that it could be used to maintain a substantially airtight seal throughout the various motions of FIG. 2A-2C, such as can be optionally the vase by combining the present invention with Applicants' U.S. Pat. No. 4,981,634. Alos note that the sprue has been removed from view already—it was separated from the disk when the gate was closed off before the plastic therein was solidified, thereby "molding in" the centerhole. By adhering the B side of the sprue to an undercut member of the ejector assembly, the sprue will be pulled along with that undercut member of the ejector assembly, as part of the ejector retraction sequence. For fastest cycling, this ejector retraction sequence can even be done before the disk is completely cooled and/or the mold opening has started. Preferably, the sprue is removed from the plane of the disk as soon as possible, so it cannot obstruct the disk's motion into the disk transfer slot or aperture (10).

See now FIG. 2Aa, a closeup view of elements seen in the righthand dotted-line-rectangle portion of FIG. 2A, to look closer at the workings of the mechanical retention and stripping mechanism located at the central portions of the disk. Note that a female undercut (9) machined into a male member (1) of the sprue bushing (31) assembly has been filled with plastic during the injection filling of the disk cavity, so that the disk will stick positively onto the male member until a stripping action is performed. Depending upon how little or much retention force is needed, the depth and/or negative draft angle of the undercut geometry can increased or decreased as needed.

Shift now to a second position of the moldset, which is preferred but optional, shown in FIG. 2B, wherein the disk transfer sequence starts. Optionally, first turn on pressurized air passageways (not shown here; previously shown in Applicants' U.S. Pat. No. 4,981,634) on both stationary and movable sides of the mold, so as to forcibly introduce clean filtered air between the partforming surfaces of the disk mold cavity and sprue assembly, such that any vacuum which tends to form between the now-solidified plastic and the molding surfaces are now broken. The central inner portion of the disk is held onto male member (1) of the sprue bushing (31) assembly because of mechanical retention due to undercuts, while the outer O.D. portion of the disk is now free of both partforming surfaces, and the pair of guides are now brought forward to a fully extended position so the substantially-squared-off disk edge is seated inside the V profile groove of the guide. (Note this is now the only point of contact between the mold and the outer portion of the disk, and the V guide geometry serves to automatically center the disk inside the V.) The spring-loaded plunger (15) is now deflected (typically, about 1.0 mm at about 1 kg force). Note that drive dog stroke gap (16) has been completely disappeared now and the drive dog (12) rests against forward hard stop (17). Note that the sprue bushing (31) assembly has pushed fully forward (see strip stroke gap (19) is now at a maximum and a similar gap ahead of the stroke limit bar (23) is now at zero). A variety of driving force means could be used for this controllable axial travel, including pneumatic or hydraulic cylinders or electric drive cylinders or, as used in FIG. 3A-3D, a settable increase of injection machine nozzle-forward pressure, which can optionally be combined with the previously-mentioned springloaded return mechanism.

See now FIG. 2Bb, a closeup view of elements seen in the righthand dotted-line-rectangle portion of FIG. 2B. This forward motion of the male member (1) has brought along the disk so it is now freed from partforming surfaces of the mold (no longer stuck onto the stamper (11), and is now located in the same plane as disk transfer slot aperture (10).

In FIG. 2C, the guide position stays the same as in FIG. 2B, but the sprue bushing (31) assembly has now been retracted back, bringing along the inner central portion of the disk, whose outer O.D. edges are still in firm contact with the fully extended guide (if the optional but preferred embodiment of FIG. 2B was used) or whose outer O.D. edges are just now brought into contact with the partly extended guide (if the optional but preferred embodiment of FIG. 2B was NOT used). See strip stroke gap (19) is now at zero and a similar gap ahead of the stroke limit bar (23) is now at a maximum. This axial motion of the sprue bushing (31) assembly has brought the disk-retaining undercut (9) of male member (1) back to where a stripping edge (2) (shown here circumferentially engaging the male member) has just popped the disk free of the undercut. Immediately after this is done as shown, the warm and flexible disk will snap back at the inside central portion, starting a decreasing series of oscillary motions flexing back and forth of the inside central portion with respect to a flat plane. If the disk were to be released immediately at the outer O.D. edges from their contact with the guides, as would be the case if the less-preferred partly-extended guide position were used in this undercut-stripping step, then the disk is still vibrating back and forth, and if dropped by gravity at this point, the disk might wobble in flight on its way into the disk transfer slot or aperture (10) and thereby strike a glancing blow therein, thus not most quickly and cleanly exit the disk mold cavity and moldset. It has been found preferably to firmly grasp the disk by fully extended guides before the undercut-stripping action is started, and to maintain such a firm pressure onto the outer O.D. egdes of the disk for vibration damping purposes, at least for some slight time delay after the stripping has occurred. As long as this firm contact is maintained, the disk can't drop.

FIG. 2Cc, a closeup view of elements seen in the righthand dotted-line-rectangle portion of FIG. 2C, shows that rearward motion of the male member (1) has pulled back the inner central portion of the disk (7) (still stuck on undercut (9)) up to but not past the stripping edge (2), while at the same time the guides firmly hold the O.D. edge of the disk, so it is now bowed inward for an instant (see also FIG. 2C showing the disk flexing as described).

Figure 2D:
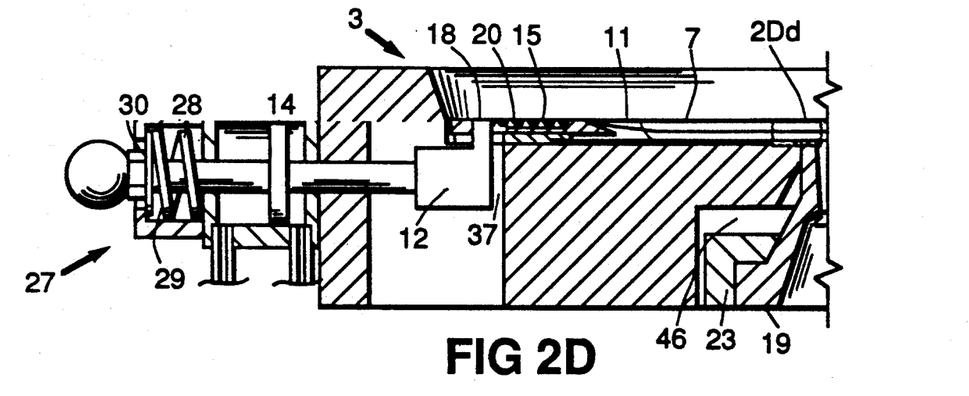

In FIG. 2D, another guide position in the disk transfer sequence is completed by moving the guides to a partly extended position which is intermediate between the fully retracted and fully extended positions. Note that drive dog stroke gap has been partially recovered now and the drive dog (12) no longer rests against the forward hard stop. This gap now allows the optional spring plunger (15) to bring back the guide to a partly extended position no longer in contact with the disk's O.D. edge (see disk release stroke (37)) so that the disk may now drop freely through disk transfer slot aperture (10). Optional disk driver (shown in FIG. 1 as (26) and disk driver cylinder (26)) could now act to push the disk downward to accelerate its exit from the disk moldset.

In the optional but preferred process sequence, the molded disk is positively pressed near or at its outside edges against the V-shaped guide system, thus held in the same plane as the disk transfer slot at least until rearward axial travel of the male member has retracted out of this plane (to strip off the undercut). Preferably, some slight time delay after sprue separation from the disk allows for such axial travel of the male mamber while vibration-damping contact with the guides stabilizes the disk's orientation (it has been found that prematurely dropping free the disk actually can slow disk transfer speed, since the disk doesn't always cleanly hit the open aperture—glancing off the edges causes bouncing back and forth of the disk edge off the aperture inner walls). Moving now the guides to the partly extended position frees the molded disk to drop downward on through the aperture as soon as the male member have been removed from this same plane.

FIG. 2Dd, a closeup view of elements seen in the righthand dotted-line-rectangle portion of FIG. 2D, shows that completion of the rearward motion of the male member (1) has pulled back past the stripping edge (2) to a fully-retracted position of male member (1), and in so doing, the inner central portion of the disk (7) has pulled free of undercut (9), before the guides relax their hold on the O.D. edge of the disk (to absorb the vibrations). Then, when the guides move to the partly extended position shown in FIG. 2D, the disk is free to drop out through disk transfer slot aperture (10) and the guides prevent the disk from losing co-planar orientation with the aperture (10).

See now FIG. 3A-3D, showing one alternative but preferred embodiment of the present invention. It is believed to advantageously provide a different way to fill the disk mold cavity and form a molded-in centerhole, and thereby the separation of sprue and disk within the closed moldset at such an early stage in the molding cycle that the hot thermoplastic comprising both sprue and disk are still not solidified at the annular gate joining sprue to disk. Furthermore, this embodiment has adventageous differences over the cited prior art, specifically including the Ehrler and Eichlseder patents.

Figure 3A:
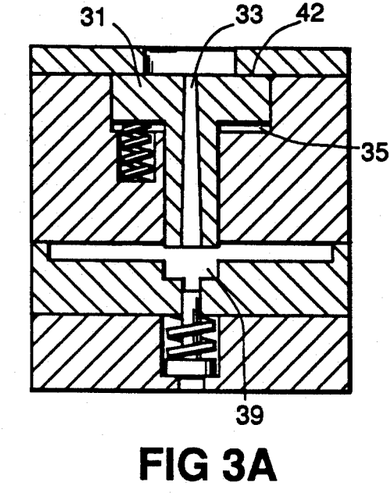

In FIG. 3A, a partial cross-sectional view of a greatly-simplified disk moldset of this embodiment shows the sprue assembly and disk cavity (both now empty) at a first position which is before injection of the molten thermoplastic has been started. Note that a gap exists at gate closure stroke (35) now and none now exists at gate open limit (42).

Figure 3B:
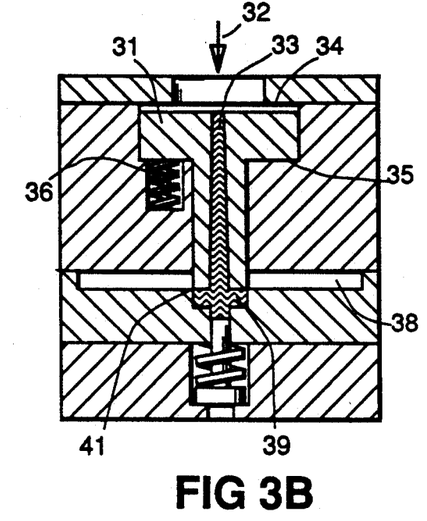

In FIG. 3B, the injection molding machine is applying a settable nozzle pressure (32) (nozzle tip not shown) applied against the sprue bushing (31) such that the nozzle pressure is biasing forward the sprue bushing into a first position, wherein the annular gate (41) is now closed, due to the axial deflection forward caused by the nozzle pressure. A typical nozzle pressure would be less than or equal to 5000 psi. Note that the nozzle pressure has compressed optional spring (36) and caused gap (35) to become substantially zero, and that the injection of molten thermoplastic resin has started and the sprue (33) is filled but the sum of the injection melt pressure plus the spring's (36) forceis not yet great enough to overcome the injection molding machine's nozzle pressure (32). At this point, the annular gate (41) is said to be closed, by our definition, since it is not sufficiently open to permit filling of the disk mold cavity. Note that a gap no longer exists at gate closure stroke (35) and one now exists at gate open limit (42).

Figure 3C:
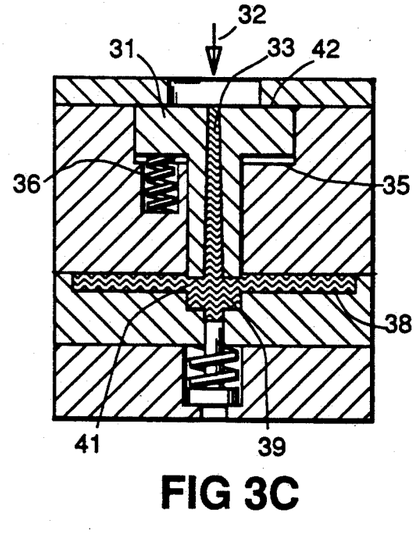

See FIG. 3C. It shows the next step in the injection molding cycle, at which point thermoplastic melt is being injected under typical high injection pressure (5–10,000 psi), at which point the pressure exerted upon the melt in the disk flange cavity (39) forces rearward the sprue bushing (31); this axial deflection rearward is achieved whenever pressure of the injection is significantly greater than pressure of the nozzle being held forward, so as can be seen the annular gate (41) is now open and plastic freely flows into the disk cavity (38) and fills it. (One advantage of this embodiment versus conventional CD molds' highly constrictive fixed-opening-size "film gates" is that greater filling rates can be achieved, through changing settable values. Thus the gatew is no longer of a fixed dimension.) Note that a gap again exists at gate closure stroke (35) and none now exists at gate open limit (42).

Figure 3D:
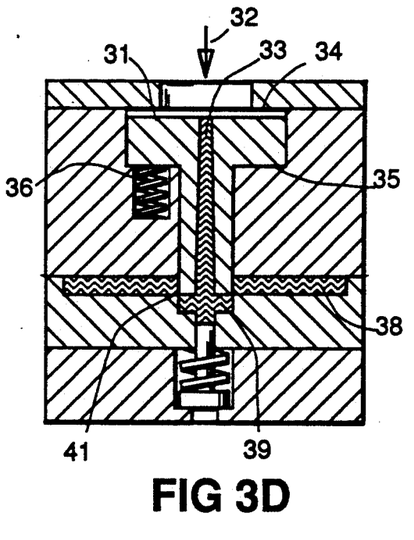

See FIG. 3D. At this next point in the disk molding cycle, annular gate (41) has been closed now that the disk cavity (38) has been completely filled and packed, and so no more molten thermoplastic is flowing through the sprue (33), through the sprue flange cavity (39) and into the disk cavity (38). At this point, the pressure of injection is typically dropped to a point below the pressure exerted on the injection nozzle forward pressure. As a result, axial deflection of the sprue bushing (31) has again brought forward substantially to its first position. Therefore, the annular gate (41) is now automatically closed in a manner similar to a spring-loaded valve gate or spring-loaded shutoff nozzle. (Alternatively, this step can be initiated by increasing the settable nozzle pressure (32)).

Note that the plastic is still not solidified in FIG. 3D, yet the gate is closed off from the disk itself. This is believed to be a major improvement over the Eichlseder and Ehrler patents, in that the Applicants' centerhole is thereby "molded in" the disk rather than being torn or punched out of solidified plastic which inherently causes the dusting of solid resin particles (which Ehler proposes to cure by means of his vacuum and sprue handling techniques). The present invention is believed therefore to be superior because it solves the dusting problem "at its source". Similarly, the present invention is seen to be an improvement over Eichlseder which teaches to mold only 70 percent of the hole (conversely, he is tearing 30 percent of the thickness of the solidified disk via his reduced annular gate aperture). In contrast, the present invention can be seen to have "molded in" substantially all of the hole depth (i.e., "forming" the hole in hot plastic vs. punching already-solidified plastic).

In this optional but preferred embodiment of centerhole formation, as shown in FIG. 2A-2D, a controlled undercut may be made onto the forward end of sprue bushing (31) to provide the desired mechanical retention onto the molded disk's inner central portion. Once the centerhole is completely formed as just described, the molded optical disk is still supported by the guide to maintain positive alignment in the desired plane (i.e., the disk is located directly above the downward facing aperture) and the disk will be free to drop as soon as the sprue (33) has been removed from this plane and the guides are in the partly extended position to release their contact with the outer O.D. edges of the disk.

See now FIG. 4. As shown in the righthand side of the split view, with the moldset in a closed position, an optional but less preferred embodiment uses a conventional fixed-dimension annular film gate (41') which is sized large enough to be sufficiently open so to properly fill the disk cavity, yet is sized small enough (i.e. much thinner than the disk itself) to be torn away from the disk when a shearing die is contacted and shearing actions are used to separate the disk (7') from the sprue. Note that a large undercut is formed on the B side of the sprue flange (39'), to bond it onto the axially-moveable ejector assembly (45) comprising an annular ejector core (male member) and an ejector pin slidably movable therein. (An ejector pin is preferred, but it would be obvious to substitute functional equivalents, such as combining a concentric sleeve and core arranged with slidable fit).

See now the lefthand side of the split view of FIG. 4, with the moldset in an opening position, the disk (7') and its still-attached sprue (33') are pulled off the disk mold cavity's partforming surfaces by retraction rearward of the ejector assembly as shown, while further opening stroke of the disk moldset continues on rearward. As per FIGS. 2A-2D, movement of the guide system from a retracted first position to a fully extended second position brings into controlled V-edge contact with the disk's outer O.D. edge surfaces (not shown here). Now an additional axial travel (not shown) by the male member (onto which the sprue and attached molded disk are firmly retained) pulls the molded disk (7') against the inside edge (2') of the concentric B side mold cavity, which then functions as a shearing die when additional movement of the ejector assembly continues rearward, resulting thereby in the sprue separating from the disk. (This resembles the Eichlseder means for tearing an annular "film gate"). One such embodiment releases the forward force of a spring-loaded ejector assembly biased such that a positive force must be maintained forward by the injection molding machine's ejector to overcome the springload to hold the male member in a first, forward position. This first ejector position is held during injection and solidification and separation of the molded disk and attached sprue off the disk mold cavity's partforming surfaces. Releasing the forward ejector force causes relative axial motions between the male member housed inside the concentric sleeve, retracting the sprue (being pulled backward by the male member) against the shearing die surface supporting the disk, thus separating at the annular gate (41') the sprue (33') from the disk when the ejector is now in a second position.

An alternate but less preferred embodiment (not shown) reverses the actions, so that forward force by the ejector pushes the male member and sprue forward to separate from the disk, but now must retract by either first pushing an ejector pin forward, knocking off the sprue at that point and then pulling back the male member until it is no longer in the second vertical plane, or else pulling back the male member with attached sprue till both male member and sprue are no longer protruding into the second vertical plane. The former is less preferred because the free-dropped sprue could bounce off either the optical disk mold cavity's partforming surfaces or the disk itself, causing surface mar damages, or because the length of the sprue will force at least that much longer strokelength of the mold traveling from its first to its second position, which wastes cycle time, and because such long strokelength may make it difficult or impossible to maintain the axially-elongated mold cavity of Applicants' U.S. Pat. No. 4,981,634 suitably enclosed to prevent entry by ambient air external to the moldset, thus reducing cleanliness of the optical disk and its partforming mold surfaces by exposure to airborne contaminants. The latter is also less preferred because pulling the sprue back through the centerhole produces some rubbing of rough plastic to plastic surfaces, causing microscopic "plastic dust" particle contaminants.

In both these embodiments for separating the sprue from the disk and forming thereby the centerhole of the disk, however, the molded optical disk and attached sprue stay together until the disk's O.D. edge makes contact with the supporting surfaces of the fully or partly extended guide system, with just enough mechanical retention force to firmly grip the disk but not so great as to warp or "oilcan" the still-warm molded disk. For this purpose, a "V" configuration of the guide's disk-contacting surfaces is preferred, since the disk edge profile is squared off. See FIGS. 2A-2D, which shows in enlarged partial sectional view the way the disk's square edge and guide's V combine to minimize points of contact and to prevent any accidental contact with the optical-information-bearing inner disk surfaces.

It should be noted that both the preferred embodiment of FIGS. 3A–3D and the optional but less preferred embodiment of FIG. 4 can employ the same means for disposing of the sprue even though they do not employ the same sequence of steps for separating the sprue from the disk. Once separated from the disk, both embodiments of the present invention preferably retain the sprue onto the ejector member while the ejector is fully retracted back to a position within the movable moldhalf wherein the sprue is now aligned over a sprue discharge aperture which opens upward onto the path of axial travel of the ejector. Preferrably, this aperture opens out the bottom of the movable moldhalf of the moldset, so that it is in fluid communication with ambient air external to the moldset when the ejector is fully retracted to this position, but when the ejector is forward during the rest of the molding cycle, this aperture is substantially closed off to ambient air external to the moldset. See Applicants' U.S. Pat. No. 4,981,634 incorporated herein by reference, FIGS. 2A–2E, which shows the location and workings of such a sprue discharge chute (44) in combination with ejector pin (25) and sleeve (26), to dispose of the sprue after it's been separated from the disk.

All sprue embodiments shown so far are of a conventional solid conically-tapered sprue geometry. An alternative embodiment could use a "hollow sprue" of the type claimed in Applicants' commonly-owned U.S. Pat. No. 5,068,065 issued Nov. 26, 1991, incorporated herein by reference. Note that FIGS. 3A–3C therein show how the hollow sprue may be separated from the disk to form the centerhole.

In general, the shorter the strokelength required must go from a first position of the moldset ("mold closed") to a second position ("mold open") and back again, the faster cycling the molding process will be. Also, keeping the distance between first and second positions as short as possible favors being able to keep the outside perimeter of the mold cavity closed off against ambient external air except for the opening provided at the downward facing aperture, thus providing the secondary benefit of greater cleanliness, as taught and claimed in Applicants' U.S. Pat. No. 4,981,634. However, it should be noted that the present invention is definitely not limited to such an enclosed-elongated embodiment. The analogous steps of FIGS. 2A–2D could be conducted with a completely "open" mold cavity. For example, use of very long mold opening stroke in axial travel from first to second positions of the disk moldset of U.S. Pat. No. 4,981,634 would cause that mold to open up to external air along the whole parting line plane, yet if the disk moldset of U.S. Pat. No. 4,981,634 incorporated the present invention, it will still function in providing for improved disk removal and centerhole formation/sprue separation functions of the injection molding disk process. Other things equal, such a long axial travel stroke length will be slower than a shorter one and will have the same cleanliness problems and limitations of the prior art (other than Applicants' U.S. Pat. No. 4,981,634 patent), so it is considered to be a less preferred but alternative embodiment which is fully workable for purposes of the present invention.

Although all embodiments shown are of a single cavity optical disk moldset, the present invention is not limited to single cavity. For example, a 2-cavity mold design is possible, wherein a "mirror image" of the FIG. 1 moldset is placed side-by-side and operating in concurrent sequences, so one discharges its disk to the righthand side while the other discharges its disks to the lefthand side, and the sprues drop freely out the bottoms through sprue discharge chutes within the movable moldhalf.

We claim:

1. A method for injection molding thermoplastic optical disks within a moldset having a movable moldhalf and a stationary moldhalf closing at a parting line, the moldset containing a sprue bushing having a female sprue bushing member and an opposing male ejector core member co-axially aligned with a nozzle tip of an injection molding machine so as to form a sprue melt passageway from the nozzle tip on an upstream end to an annular gate to a disk mold cavity having opposing partforming surfaces on a downstream end, the sprue bushing member having sufficient undercut geometry to controllably retain an inner central portion of the disk and the opposing ejector core member having sufficient undercut geometry to controllably retain the sprue, comprising the steps of:

a. injecting thermoplastic melt into the sprue melt passageway through the annular gate to fill the disk mold cavity while the moldset is in a closed position, then closing the annular gate before the melt therein is solidified, b. holding the sprue onto the ejector core member by molded-in undercut retention, moving the ejector core member away from the parting line past a stripping edge on the movable moldhalf to reach a position above a sprue discharge aperture within the movable moldhalf, and stripping the sprue by bringing an ejector pin toward the parting line past the ejector core member, to drop the sprue out of the moldset through the sprue discharge aperture, c. holding a central inner portion of the disk onto the sprue bushing member by molded-in undercut retention, while moving the sprue bushing member toward the parting line and moving the movable moldhalf partforming surface away from the parting line a greater distance than that moved by the sprue bushing member, both motions taking place during mold opening motions of the movable moldhalf, to separate the disk off both opposing partforming surfaces but still retaining the disk onto the sprue bushing member so that the disk is now co-aligned in a plane with a disk transfer slot aperture located within the disk mold cavity's outer perimeter, d. extending a movable mechanical guide to at least one extended position which lies in the same plane as the disk transfer slot aperture, e. retracting the sprue bushing member away from the parting line past a stripping edge while the mechanical guide contacts only on an outer diameter edge of the disk, thereby stripping the disk off the sprue bushing undercut, to free the disk to enter the disk transfer slot aperture and thus exit the moldset, and f. retracting the guide, moving the ejector core member forward toward the parting line and moving the movable moldhalf to its closed position, to start another molding cycle.

2. A method of claim 1 wherein a coordinated pair of opposingly mounted guides having V shaped contours are moved from a retracted position to a fully extended position to make firm contact with an outer diameter edge of the disk until at least stripping the disk off the sprue bushing undercut of the sprue bushing member is completed, so as to permit vibration damping of the disk, then the guides are moved to a partly extended position intermediate between the fully extended position and retracted position, so that the disk loses contact with the guides and the disk enters the disk transfer slot aperture.

3. A method of claim 1 wherein the annular gate is in a closed position before injecting thermoplastic melt into the sprue melt passageway, then the annular gate is opened to fill the disk mold cavity, then again closing the annular gate before the melt therein is solidified, to mold in a centerhole in the disk.

4. A method of claim 2 wherein the disk transfer slot aperture is downward facing so that after the guides releases the disk, the disk drops through the disk transfer slot aperture and exits the moldset by gravity.

5. A method of claim 2 wherein at least by the time that the guides are moved to a partly extended position, a disk driver mounted opposite to the disk transfer slot aperture is actuated so that the disk driver pushes against the disk to accelerate its exit from the moldset.

6. A method of claim 1 wherein the step of moving the movable moldhalf to the closed position substantially seals off the outer perimeter of the disk mold cavity from air external to the moldset, and
maintaining the closed outer perimeter except for the disk transfer slot aperture which is in fluid communication with air external to the moldset only when the moldset is in an open position, the disk transfer slot aperture being downward facing to prevent convective air currents external to the moldset from contacting the partforming surfaces therein.

7. A method of claim 1 wherein the step of moving the movable moldhalf to the closed position substantially seals off the outer perimeter from air external to the moldset, and
maintaining the closed outer perimeter except for the disk transfer slot aperture which is in fluid communication with air external to the moldset only when the moldset is in an open position, the disk mold cavity being capable of being controllably supplied internally with pressurized filtered gas at least when in an open position, and pressurizing the mold cavity internally with pressurized filtered gas at least when the open position is reached, so as to create positive pressure higher than ambient air pressure external to the moldset whereby filtered pressurized gas flows so ambient air is prevented from entering the disk mold cavity through the disk transfer slot aperture.

8. A method of claim 6 wherein gravity is utilized in the step of transferring the disk out of the moldset, by co-aligning the disk vertically over the downward facing disk transfer slot aperture within the same plane, and gravity is additionally utilized by joining the aperture into a discharge chute containing an inclined plane V-profile guide track in which the disk rolls down on its outer diameter edge in contact with the guide track.

9. A method of claim 1 wherein the opposing male ejector core member has a spreader die contour of a generally conically-tipped torpedo-shape, the male ejector core member protruding substantially into the female sprue bushing member and the male ejector core being separated from the female sprue bushing member in a first position to form at least substantially upstream from the gate an annular open aperture between the male ejector core member and the female sprue bushing member wherein a hollow sprue may be molded, the hollow sprue having both inside and outside surfaces, and at least the male ejector core member being maintained at a temperature below a solidification temperature of the thermoplastic by a mass transport cooling mechanism.

10. A method for injection molding thermoplastic optical disks within a moldset having a movable moldhalf and a stationary moldhalf closing at a parting line, the moldset containing a sprue bushing having a female sprue bushing member and an opposing male ejector core member co-axially aligned with a nozzle tip of an injection molding machine so as to form a sprue melt passageway from the nozzle tip on an upstream end to an annular gate to a disk mold cavity having opposing partforming surfaces on a downstream end, the annular gate being thinner than the disk, and the ejector core member having sufficient undercut geometry to controllably retain the sprue, comprising the steps of:

a. injecting thermoplastic melt into the sprue melt passageway through the annular gate to fill the disk mold cavity while the moldset is in a closed position, and cooling the disk to solidification with attached sprue, b. opening the moldset by moving a movable platen rearward away from the parting line while holding the sprue and attached disk onto the ejector core member by molded-in undercut retention, and the ejector core member moving a smaller distance rearward than the disk cavity's partforming surface housed in the movable moldhalf mounted on the movable platen, thereby separating the disk off the opposing partforming surfaces but still retaining the disk and attached sprue onto the ejector core member so that the disk is co-aligned in a plane with a disk transfer slot aperture located within the disk mold cavity's outer perimeter, c. extending a movable mechanical guide mounted outside the disk mold cavity's outer perimeter to at least one extended position which lies in the same plane as the disk transfer slot aperture, d. retracting the ejector core member further rearward away from the parting line past a shearing edge die located as a concentric sleeve to the ejector core member such that when the ejector core member travels rearward of the shearing edge die, the annular gate attaching the disk to the sprue is severed, and freeing the disk of the sprue by continued rearward motion of the ejector core member retaining the sprue until reaching a position above a sprue discharge aperture within the movable moldhalf, the disk entering the disk transfer slot aperture, e. stripping the sprue by bringing an ejector pin slidably disposed within the ejector core member forward past the ejector core member, to free the sprue of the ejector core member's undercut and thereby drop the sprue out of the moldset through the sprue discharge aperture, and f. retracting the guide, moving the ejector core member forward toward the parting line and moving the movable moldhalf to its closed position, to start another molding cycle.

11. A method of claim 10 wherein a coordinated pair of opposingly mounted guides having V shaped contours are moved from a retracted position to a fully extended position to make firm contact with an outer diameter edge of the disk until at least stripping the disk off the ejector core member's undercut is completed, so as to permit vibration damping of the disk, then the guides are moved to a partly extended position intermediate between the fully extended position and retracted position, so that the disk loses contact with the guides and the disk enters the disk transfer slot aperture.

12. A method of claim 11 wherein the disk transfer slot aperture is downward facing so that after the guides releases the disk, the disk drops through the disk transfer slot aperture and exits the moldset by gravity.

13. A method of claim 11 wherein at least by the time that the guides are moved to a partly extended position, a disk driver mounted opposite to the disk transfer slot aperture is actuated so that the disk driver pushes against the disk to accelerate its exit from the moldset.

14. A method of claim 10 wherein the step of moving the movable moldhalf to the closed position substantially seals off the outer perimeter of the disk mold cavity from air external to the moldset, and maintaining the closed outer perimeter except for the disk transfer slot aperture which is in fluid communication with air external to the moldset only when the moldset is in an open position, the disk transfer slot aperture being downward facing to prevent convective air currents external to the moldset from contacting the partforming surfaces therein.

15. A method of claim 10 wherein the step of moving the movable moldhalf to the closed position substantially seals off the outer perimeter from air external to the moldset, and maintaining the closed outer perimeter except for the disk transfer slot aperture which is in fluid communication with air external to the moldset only when the moldset is in an open position, the disk mold cavity being capable of being controllably supplied internally with pressurized filtered gas at least when in an open position, and pressurizing the mold cavity internally with pressurized filtered gas at least when the open position is reached, so as to create positive pressure higher than ambient air pressure external to the moldset whereby filtered pressurized gas flows so ambient air is prevented from entering the disk mold cavity through the disk transfer slot aperture.

16. A method of claim 14 wherein gravity is utilized in the step of transferring the disk out of the moldset, by co-aligning the disk vertically over the downward facing disk transfer slot aperture within the same plane, and gravity is additionally utilized by joining the aperture into a discharge chute containing an inclined plane V-profile guide track in which the disk rolls down on its outer diameter edge in contact with the guide track.

17. A method of claim 10 wherein the opposing male ejector core member has a spreader die contour of a generally conically-tipped torpedo-shape, the male ejector core member protruding substantially into the female sprue brushing member and the male ejector core member being separated from the female sprue bushing member in a first position to form at least substantially upstream from the gate an annular open aperture between the male ejector core member and the female sprue bushing member wherein a hollow sprue may be molded, the hollow sprue having both inside and outside surfaces, and at least the male ejector core member being maintained at a temperature below a solidification temperature of the thermoplastic by a mass transport cooling mechanism.

18. An apparatus for injection molding thermoplastic optical disks within a moldset, the moldset comprising:

a. a sprue bushing having a member and an opposing ejector assembly having a member, both members co-axially aligned with a nozzle tip of an injection molding machine so as to form a sprue melt passageway from the nozzle tip on an upstream end to an annular gate to a disk mold cavity on a downstream end, the sprue member having sufficient undercut geometry to controllably retain an inner central portion of the disk and the opposing ejector member having sufficient undercut geometry to controllably retain the sprue, means for controllable axial travel of the sprue member and the opposing ejector member, a stripping edge located adjacent to the sprue member such that when the sprue members travels rearward of the stripping edge, the inner central portion of the disk shall be freed of the sprue member's undercut, an ejector pin slidably disposed within the opposing ejector member, such that when the ejector pin is traveled forward of the ejector member, the sprue shall be freed of the ejector member's undercut, b. the disk mold cavity starting at the annular gate an upstream end and ending at an outer perimeter on the downstream end of the thermoplastic melt flow and the disk mold cavity having movable and stationary sides on either side of a parting line, opposing movable and stationary partforming surfaces housed in movable and stationary moldhalves mountable onto movable and stationary platens of the injection molding machine such that the movable partforming surface can be moved between at least a closed position at a first vertical plane and an open position at a second vertical plane in each molding cycle, the movable moldhalf containing a sprue discharge aperture which opens onto the axially-disposed ejector assembly, through which the sprue may be dropped after being freed of the ejector member's undercut, one disk transfer slot aperture located in the disk mold cavity's outer perimeter and the disk transfer slot aperture located fixedly at a vertical plane between the first vertical plane and the second vertical plane, at least one movable mechanical guide mounted outside the disk mold cavity's outer perimeter, the mechanical guide having a paddle with a contoured edge for contacting an outer diameter edge of the disk without damage, and the mechanical guide being in a retracted position when the moldset is in the closed position and being in at least one extended position when the moldset is in its open position wherein the paddle with a contoured edge lies in the same vertical plane in line with the aperture, and means for controllably moving the mechanical guide from the retracted position to at least one extended position and then retracting, such that the molded sprue and a central inner portion of the disk are held by molded-in retention into undercut geometry on the ejector member and the sprue member, the sprue being removed by axial travel of the sprue member before stripping off the sprue undercut and dropping out the sprue discharge aperture, and the disk being separated off the opposing partforming surfaces by opening the moldset and by axial travel of the sprue member, then extending the movable mechanical guide before stripping off the disk undercut, and the disk now losing contact with the guide so the disk enters the disk transfer slot aperture then exits the moldset.

19. An apparatus of claim 18 wherein means for controllable axial travel of the co-axially aligned opposing sprue member and ejector member are actuated to urge apart the sprue member and ejector member to open the annular gate to fill the disk mold cavity with injected thermoplastic melt, then said means are actuated to urge together the sprue member and ejector member to close the annular gate after the disk mold cavity has been filled but before the injected thermoplastic melt is solidified in the annular gate.

20. An apparatus of claim 18 wherein a coordinated pair of mechanical guides having paddles with a contoured V shaped edge is used.

21. An apparatus of claim 20 wherein the coordinated pair of mechanical guides have drive means for controllably moving the mechanical guide from the retracted position to one fully-extended position and next to a partly extended position.

22. An apparatus of claim 20 wherein disk driver means are mounted outside the disk mold cavity's outer perimeter at a location opposite the aperture, the disk driver being in a retracted position until the guides release the disk, at which time means are actuated to extend the disk driver forward, then again retract after the disk enters the aperture.

23. An apparatus of claim 18 wherein the disk moldset houses a plurality of disk mold cavities.

24. An apparatus for injection molding thermoplastic optical disks within a moldset, the moldset comprising:

a. a sprue bushing assembly having a member and an opposing ejector assembly having a member, both members co-axially aligned with a nozzle tip of an injection molding machine so as to form a sprue melt passageway from the nozzle tip on an upstream end to an annular gate to a disk mold cavity on a downstream end, the opposing ejector member having sufficient undercut geometry to controllably retain the sprue, and means for controllable axial travel of the opposing ejector member, a shearing edge die located as a concentric sleeve to the opposing ejector member such that when the ejector member travels rearward of the shearing edge, the annular gate attaching the disk to the sprue is severed and the disk shall be freed of the sprue, and an ejector pin slidably disposed within the opposing ejector member, such that when the ejector pin is traveled forward of the ejector member, the sprue shall be freed of the ejector member's undercut, b. the disk mold cavity starting at the annular gate at an upstream end and ending at an outer perimeter on the downstream end of the thermoplastic melt flow and the disk mold cavity having movable and stationary sides on either side of a parting line, opposing movable and stationary partforming surfaces housed in movable and stationary moldhalfs mountable onto movable and stationary platens of the injection molding machine such that the movable partforming surface can be moved between at least a closed position at a first vertical plane and an open position at a second vertical plane in each molding cycle, the movable moldhalf containing a sprue discharge aperture which opens onto the axially-disposed ejector assembly, through which the sprue may be dropped after being freed of the ejector member's undercut, one downward-facing disk transfer slot aperture located in the disk mold cavity's outer perimeter and the disk transfer slot aperture located fixedly at a vertical plane between the first vertical plane and the second vertical plane, at least one movable mechanical guide mounted outside the disk mold cavity's outer perimeter, the mechanical guide having a paddle with a contoured edge suitable for contacting an outer diameter edge of the disk without damage, and the mechanical guide being in a retracted position when the moldset is in the closed position and in at least one extended position when the moldset is in its open position wherein the paddle with a contoured edge lies in the same vertical plane in line with the disk transfer slot aperture, and means for controllably moving the mechanical guide from the retracted position to at least one extended position and then retracting, such that the molded sprue and the attached disk are held by molded-in mechanical undercut geometry on the opposing ejector member while the disk is separated off the opposing partforming surfaces by opening the moldset and by axial travel of opposing sprue and ejector members, then extending the movable mechanical guide, followed by the sprue being removed from the disk by rearward axial travel of the sprue member against the shearing edge die, then continuing rearward travel further before stripping off the sprue undercut when positioned axially above the sprue discharge aperture, so that the disk may now lose contact with the guide and the disk drops through the downward-facing aperture and exits the moldset by gravity.

25. An apparatus of claim 24 wherein a coordinated pair of mechanical guides having paddles with a contoured V shaped edge is used.

26. An apparatus of claim 25 wherein the coordinated pair of mechanical guides have drive means for controllably moving the mechanical guide from the retracted position to one fully-extended position and next to a partly extended position.

27. An apparatus of claim 25 wherein disk driver means are mounted outside the disk mold cavity's outer perimeter at a location opposite the aperture, the disk driver being in a retracted position until the guides release the disk, at which time means are actuated to extend the disk driver forward, then again retract after the disk enters the aperture.

28. An apparatus of claim 24 wherein the disk moldset houses a plurality of disk mold cavities.

* * * * *